United States Patent
Lu et al.

(10) Patent No.: US 9,420,535 B2
(45) Date of Patent: Aug. 16, 2016

(54) USER EQUIPMENT, A NETWORK NODE AND METHODS THEREIN FOR ADJUSTING THE LENGTH OF A DISCONTINUOUS RECEPTION CYCLE IN A USER EQUIPMENT IN A WIRELESS COMMUNICATION SYSTEM

(71) Applicant: TELEFONAKTIEBOLAGET L M ERICSSON (PUBL), Stockholm (SE)

(72) Inventors: Qianxi Lu, Beijing (CN); Rui Fan, Beijing (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/381,402

(22) PCT Filed: Oct. 29, 2012

(86) PCT No.: PCT/SE2012/051171
§ 371 (c)(1),
(2) Date: Aug. 27, 2014

(87) PCT Pub. No.: WO2013/147665
PCT Pub. Date: Oct. 3, 2013

(65) Prior Publication Data
US 2015/0126196 A1 May 7, 2015

(30) Foreign Application Priority Data
Mar. 26, 2012 (WO) ................ PCT/CN2012/073009

(51) Int. Cl.
*H04W 36/00* (2009.01)
*H04W 52/02* (2009.01)
*H04W 76/04* (2009.01)
*H04W 24/10* (2009.01)
*H04W 36/08* (2009.01)
*H04W 88/02* (2009.01)
*H04W 88/08* (2009.01)

(52) U.S. Cl.
CPC ...... *H04W 52/0216* (2013.01); *H04W 36/0072* (2013.01); *H04W 36/0094* (2013.01);
(Continued)

(58) Field of Classification Search
CPC .................................................. H04W 76/048
USPC ......................................................... 455/437
See application file for complete search history.

(56) References Cited

U.S. PATENT DOCUMENTS 8,195,164 B2 6/2012 Kazmi
2009/0186614 A1* 7/2009 Aoyama et al. ............... 455/436
(Continued)

FOREIGN PATENT DOCUMENTS

| EP | 2 034 633 | 3/2009 |
|---|---|---|
| WO | WO 2008/082347 | 7/2008 |
| WO | WO 2010/053425 | 5/2010 |

OTHER PUBLICATIONS

International Search Report for International application No. PCT/SE2012/051171, Feb. 12, 2013.
(Continued)

*Primary Examiner* — Sam K Ahn
*Assistant Examiner* — Fabricio R Murillo Garcia
(74) *Attorney, Agent, or Firm* — Baker Botts, LLP (57) ABSTRACT

Method (500) in a user equipment (110) for setting a length of a discontinuous reception cycle of the user equipment (110), which is served by a serving network node (120) in a wireless communication network (100). The method (500) comprises acquiring (501) information related to a property of a signal received from the serving network node (120). Also, the method (500) comprises setting (502) the length of the discontinuous reception cycle of the user equipment (110), based on the acquired (501) information.

14 Claims, 8 Drawing Sheets

(52) U.S. Cl.
CPC ............ *H04W 76/048* (2013.01); *H04W 24/10* (2013.01); *H04W 36/08* (2013.01); *H04W 88/02* (2013.01); *H04W 88/08* (2013.01)

(56) References Cited

U.S. PATENT DOCUMENTS

| | | | | |
|---|---|---|---|---|
| 2010/0029276 A1* | 2/2010 | Hwang | ................. | H04W 36/30 455/436 |
| 2011/0090861 A1* | 4/2011 | Kim et al. | ..................... | 370/329 |
| 2011/0183672 A1* | 7/2011 | Jeong | ................... | H04B 17/318 455/436 |
| 2013/0095819 A1* | 4/2013 | Cheng | ............... | H04W 36/0094 455/424 |

OTHER PUBLICATIONS

3GPP TSG RAN WG2 #77; Dresden, Germany; Agenda item: 7.2.1.; Source: Renesas Mobile Europe Ltd.; Title: Impact of DRX to always-on background traffic (R2-120578), Feb. 6-10, 2012.

3GPP TSG-RAN WG2 Meeting #77; Dresden, Germany; Agenda item: 7.2; Source: Huawei, HiSilicon; Title: Mobility Evaluation considering the usage of Long DRX cycle (R2-120511), Feb. 6-10, 2012.

3GPP TSG-RAN WG2 Meeting #77; Dresden, Germany; Agenda item: 7.10.5; Source: Nokia Corporation, Nokia Siemens Networks; Title: HetNet mobility and DRX (R2-120108), Feb. 6-10, 2012.

3rd Generation Partnership Project; Technical Specification Group Radio Access Network; Evolved Universal Terrestrial Radio Access (E-UTRA); Medium Access Control (MAC) protocol specification (Release 11), Mar. 2013.

Chapter II PCT Demand for International application No. PCT/SE2012/051171, Dec. 16, 2013.

PCT Written Opinion of the International Preliminary Examining Authority for International application No. PCT/SE2012/051171, Mar. 25, 2014.

PCT Notification of Transmittal of the International Preliminary Report on Patentability for International application No. PCT/SE2012/051171, Jun. 27, 2014.

3rd Generation Partnership Project; Technical Specification group Radio Access Network; Evolved Universal Terrestrial Radio Access (E-UTRA); Radio Resource Control (RRC); Protocol specification (Release 11), Mar. 2013.

* cited by examiner

A: DRS cycle = 1.28s
B: DRS cycle = 0.32s
C: DRS cycle = 0.08s
D: DRS cycle = 0.02s

USER EQUIPMENT, A NETWORK NODE AND METHODS THEREIN FOR ADJUSTING THE LENGTH OF A DISCONTINUOUS RECEPTION CYCLE IN A USER EQUIPMENT IN A WIRELESS COMMUNICATION SYSTEM

PRIORITY

This nonprovisional application is a U.S. National Stage Filing under 35 U.S.C. §371 of International Patent Application Serial No. PCT/SE2012/051171, filed Oct. 29, 2012 and entitled "A User Equipment, A Network Node and Methods Therein for Adjusting the Length of A Discontinuous Reception Cycle in A User Equipment in A Wireless Communication System," which claims priority to International Patent Application Serial No. PCT/CN2012/073009, filed Mar. 26, 2012 and entitled "Method and User Equipment in A Wireless Communication System."

TECHNICAL FIELD

Implementations described herein relate generally to a user equipment, a network node and methods therein. In particular is herein described a mechanism for adjusting length of a discontinuous reception cycle in a user equipment.

BACKGROUND

User equipment (UE), also known as mobile stations, wireless terminals and/or mobile terminals are enabled to communicate wirelessly in a wireless communication system, sometimes also referred to as a cellular radio system. The communication may be made e.g. between two user equipment, between a user equipment and a wire connected telephone and/or between a user equipment and a server via a Radio Access Network (RAN) and possibly one or more core networks.

The user equipment may further be referred to as mobile telephones, cellular telephones, computer tablets or laptops with wireless capability. The user equipment units in the present context may be, for example, portable, pocket-storable, hand-held, computer-comprised, or vehicle-mounted mobile devices, enabled to communicate voice and/or data, via the radio access network, with another entity, such as another user equipment or a server.

The wireless communication system covers a geographical area which is divided into cell areas, with each cell area being served by a radio network node, or base station e.g. a Radio Base Station (RBS), which in some networks may be referred to as "eNB", "eNodeB", "NodeB" or "B node", depending on the technology and terminology used. The radio network nodes may be of different classes such as e.g. macro eNodeB, home eNodeB or pico base station, based on transmission power and thereby also cell size. A cell is the geographical area where radio coverage is provided by the radio network node/base station at a base station site. One base station, situated on the base station site, may serve one or several cells. The radio network nodes communicate over the air interface operating on radio frequencies with the user equipment units within range of the respective radio network node.

In some radio access networks, several radio network nodes may be connected, e.g. by landlines or microwave, to a Radio Network Controller (RNC) e.g. in Universal Mobile Telecommunications System (UMTS). The RNC, also sometimes termed Base Station Controller (BSC) e.g. in GSM, may supervise and coordinate various activities of the plural radio network nodes connected thereto. GSM is an abbreviation for Global System for Mobile Communications (originally: Groupe Special Mobile).

In 3rd Generation Partnership Project (3GPP) Long Term Evolution (LTE), radio network nodes, or base stations, may be connected to a gateway e.g. a radio access gateway, to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units. The 3GPP has undertaken to evolve further the UTRAN and GSM based radio access network technologies.

The 3GPP is responsible for the standardization of GSM, UMTS, LTE and LTE-Advanced. LTE is a technology for realizing high-speed packet-based communication that may reach high data rates both in the downlink and in the uplink, and is thought of as a next generation mobile communication system relative UMTS.

In the present context, the expressions downlink, downstream link or forward link may be used for the transmission path from the radio network node to the user equipment. The expression uplink, upstream link or reverse link may be used for the transmission path in the opposite direction i.e. from the user equipment to the radio network node.

Discontinuous Reception (DRX) is a mechanism defined in 3GPP specifications for LTE to enable power savings of involved user equipments and conserve battery power. With this feature, user equipments may disable its receiver most of the time and just listen to the downlink channels during wake time, discontinuously. Discontinuous reception is applicable both in Radio Resource Control (RRC) idle state (RRC_IDLE), i.e. when the user equipment is in an idle state, and in RRC_CONNECTED states, i.e. when the user equipment is connected with the radio network node for data transmission and/or signalling.

One of the targets of the on-going enhancements for Diverse Data Applications (eDDA) in 3GPP is to provide long periods of always-on connectivity for user equipments without emptying the battery when using diverse data applications. In other words, discontinuous reception is an important feature as it helps user equipment to save battery and prolong user equipment activity time. It is of course good to configure a long discontinuous reception cycle for user equipment from power saving point of view. However long discontinuous reception cycle will result in long delay, it is not good from performance point of view. This problem is more severe when handover is taken into consideration, in particular when hard handover is utilized, as is the case in for example LTE, as the handover of the user equipment may fail, and the connection with the serving node get lost, under certain circumstances. A hard handover may be referred to in LTE when there is a short interruption in service when the handover is performed.

Specifically, user equipment with long discontinuous reception cycle takes longer time to trigger a handover event, since user equipment may only measure downlink signalling quality within wake intervals during each discontinuous reception cycle. This is illustrated by the timing of the measurements in FIG. 1, wherein signal quality is shown on the y-axis and time is shown on the x-axis. As further illustrated in FIG. 1, when the used discontinuous reception cycle is long, e.g. 1.28 s, the user equipment sends a measurement report later than expected. At time T2, the neighbour cell is already A3 offset better than the serving cell, however, not until time T3, may the user equipment know this event and not until time T5 after Time To Trigger (TTT) period, may the user equipment may send the measurement report to the radio network node, or eNB. Hence, the handover might not be able to finish in time, or even cannot finish before the link quality becomes too poor to work, i.e., a Radio Link failure may happen before that.

Therefore, a problem addressed herein is how to reduce the handover delay while keeping the power consumption of an involved user equipment low.

Figure 1:
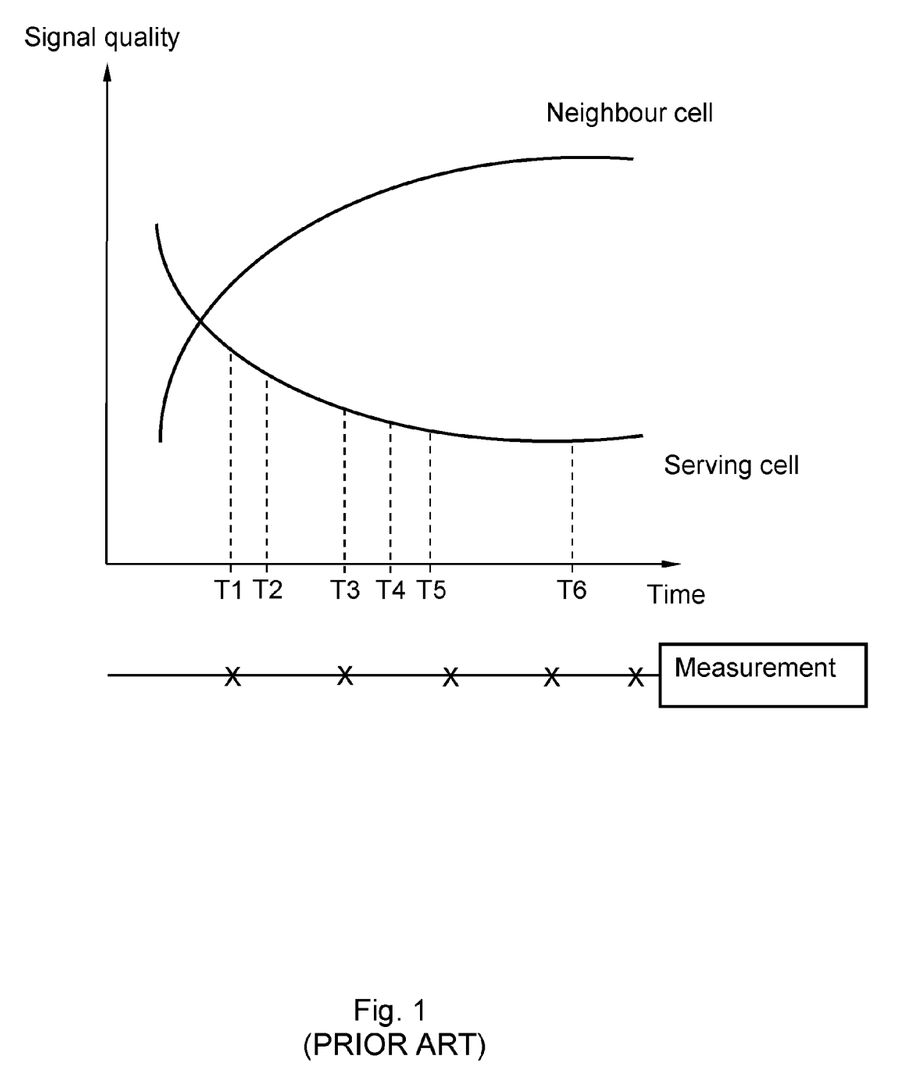
FIG. 1 is a block diagram illustrating signal quality of signals received from a serving cell and a neighbour cell, as perceived by a user equipment, and the increased handover delay resulting from long DRX cycles according to prior art.

Since discontinuous reception aims at user equipment power consumption, user equipment measurement would only happen within on-duration of discontinuous reception cycles. A straightforward solution within the scope of 3GPP specification is to configure a very short TTT length, so that the user equipment would send the measurement report to the eNB as soon as possible when the user equipment knows that an A3 event threshold is satisfied. However this method has several problems. First, this method may only reduce the handover delay after the A3 event is detected by user equipment. However, the delay from the time when the neighbour cell is A3 offset, in e.g. dB, better than serving cell to the time when user equipment detect this event cannot be reduced, i.e. this method may only reduce the delay between T3 and T5 but cannot reduce the delay between T2 and T3 as shown in FIG. 1. Furthermore, setting the TTT to be very short would result in quite many unnecessary measurement reports from the user equipment to the eNB, resulting in unnecessary and inefficient use of resources.

Another prior art proposal is to use a short discontinuous reception cycle when the user equipment send a measurement report to the eNB so that user equipment may receive handover command quickly and the user equipment restore to use long discontinuous reception cycle if eNB does not initiate handover procedure. This method may help to reduce the handover delay after time t5 as shown in FIG. 1, but does not help to reduce the delay from t2 to t5 which is more important and may easily cause radio link failure or handover failure.

SUMMARY

It is therefore an object to obviate at least some of the above mentioned disadvantages and to improve the performance in a wireless communication system.

According to a first aspect, the object is achieved by a method in a user equipment, aiming at setting a length of a discontinuous reception cycle of the user equipment. The user equipment is served by a serving network node in a wireless communication network. The method comprises acquiring information related to a property of a signal received from the serving network node. Also, the method comprises setting the length of the discontinuous reception cycle of the user equipment, based on the acquired information.

According to a second aspect, the object is achieved by a user equipment. The user equipment is configured for setting a discontinuous reception cycle of the user equipment. The user equipment is served by a serving network node in a wireless communication network. The user equipment comprises a processing circuit, configured for acquiring information related to a property of a signal received from the serving network node. The processing circuit is also configured for setting the length of the discontinuous reception cycle of the user equipment, based on the acquired information.

According to a third aspect, the object is achieved by a method in a serving network node, aiming at providing instructions for setting a length of a discontinuous reception cycle of the user equipment. The user equipment is served by the serving network node in a wireless communication network. The serving network node determine one or more threshold limits for signal(s) received at the user equipment based on information about one or more neighbouring network nodes in the wireless communication network. Then, the serving network node sends instructions to the user equipment comprising the determined one or more property threshold limits. The determined one or more property threshold limits enable the user equipment to set the length of the discontinuous reception cycle of the user equipment.

According to a fourth aspect, the object is achieved by a network node. The serving network node is configured to providing instructions for setting a length of a discontinuous reception cycle of the user equipment. The user equipment is served by the network node in a wireless communication network. The network node comprises a processing circuit configured to determine one or more threshold limits for signal(s) received at the user equipment based on information about one or more neighbouring network nodes in the wireless communication network. The processing circuit is also configured to send instructions to the user equipment comprising the determined one or more property threshold limits. The determined one or more property threshold limits enable the user equipment to set the length of the discontinuous reception cycle of the user equipment.

By setting the length of the discontinuous reception cycle of the user equipment based on acquired information related to a property of a signal received from the serving network node, the user equipment is able to optimise the discontinuous reception cycle of the user equipment; that is, by adapting it to a signal received from the serving network node a long discontinuous reception cycle may be set when the probability of a sudden handover is low and a short discontinuous reception cycle may be set when the probability of a sudden handover is high. Thus, for example, delays due to too long discontinuous reception cycle of the user equipment may be reduced when performing handover, while still maintaining a low power consumption of the user equipment. Hence, the performance in the wireless communication system is improved and at least some of the above mentioned disadvantages are obviated.

Other objects, advantages and novel features of the method and network node will become apparent from the following detailed description.

BRIEF DESCRIPTION OF THE DRAWINGS

The method, user equipment and network nodes are described in more detail with reference to attached drawings illustrating examples of embodiments in which.

DETAILED DESCRIPTION

Embodiments herein are defined as a user equipment and a method in a user equipment, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. It is further to be understood that the drawings are not necessarily drawn to scale and that, unless otherwise indicated, they are merely intended to conceptually illustrate the structures and procedures described herein.

Some advantages according to embodiments herein are that handover performance is enhanced while maintaining low power consumption of the user equipment. This is achieved by a setting a discontinuous reception cycle of the user equipment, wherein the length of the discontinuous reception cycle is differentiated. When the user equipment is situated far away from any cell border, the probability of a sudden handover due to bad signal propagation conditions is low. Thus, the discontinuous reception cycle, i.e. the period on which the user equipment is inactive and does not make e.g. any measurements or reporting of measurements to the serving network node, may be rather long without increased risk of a handover failure. When the user equipment is at, or close to the cell border, there may be a handover to the neighbour network node. For that reason, according to embodiments herein, the discontinuous reception cycle in such case is set to a low value, in order to measure and report signal propagation conditions such as signal strength and/or signal quality and report to the serving network node, in order for the serving network node to determine to do a handover of the user equipment to the neighbour network node before the signal propagation conditions between the user equipment and the serving network node has deteriorated so much that the handover fails. Different embodiments may be using different handover events and/or signal measurements for triggering a resetting of the discontinuous reception cycle. Further, a network based or user equipment based triggering may be applied in different embodiments. In further addition, embodiments herein may be implemented in the existing architecture of 3GPP LTE network, and may be implemented with full backward compatibility. Thus an improved performance within a wireless communication network is provided.

Figure 2:
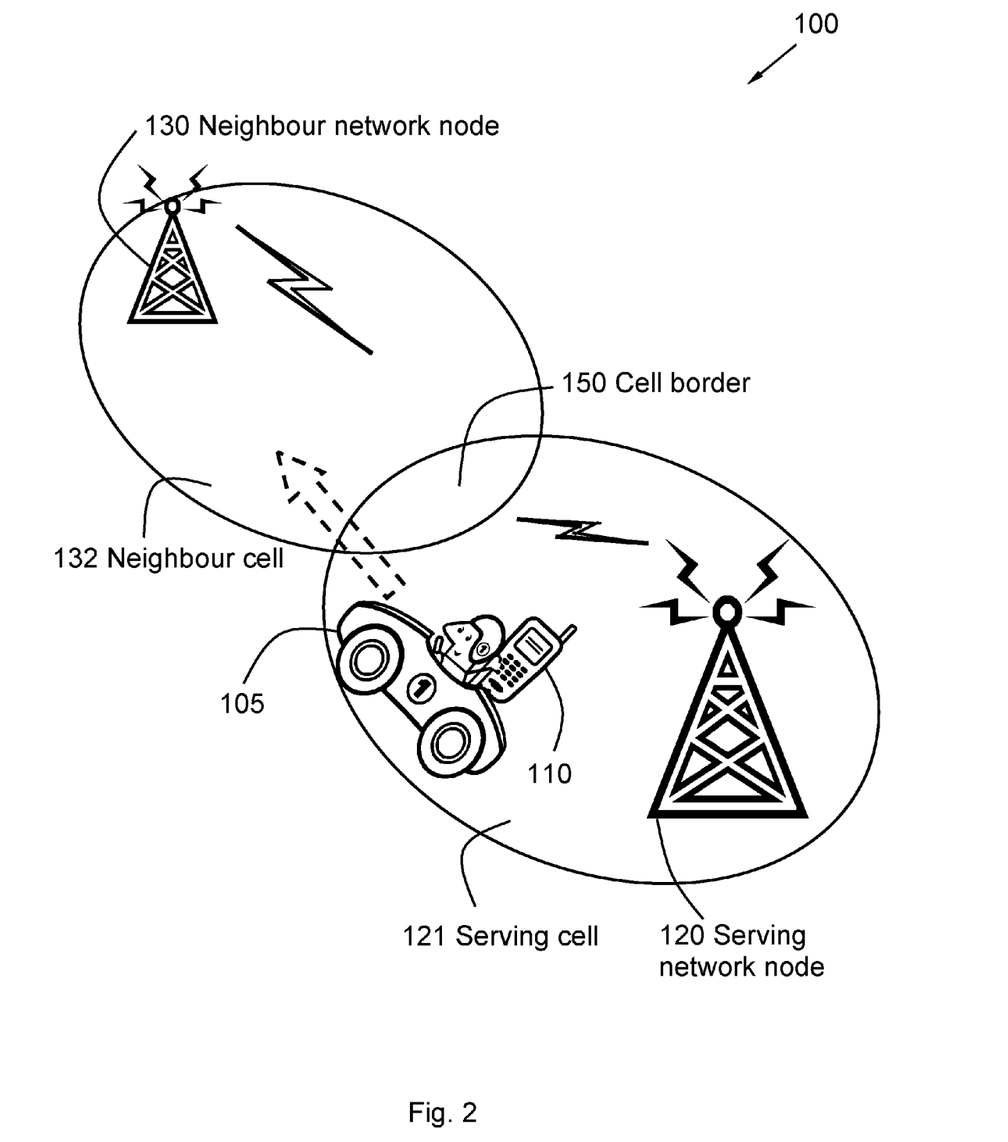
FIG. 2 is a block diagram illustrating embodiments of a wireless communication system.

FIG. 2 is a schematic illustration over a wireless communication system 100. The wireless communication system 100 may at least partly be based on radio access technologies such as e.g. 3GPP LTE, LTE-Advanced, Evolved Universal Terrestrial Radio Access Network (E-UTRAN), UMTS, GSM/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), High Speed Packet Access (HSPA), Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1×RTT and High Rate Packet Data (HRPD), just to mention some few options.

The wireless communication system 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a guard period situated in the time domain between the uplink and downlink signalling. FDD means that the transmitter and receiver operate at different carrier frequencies.

The purpose of the illustration in FIG. 1 is to provide a simplified, general overview of the methods, user equipments and network nodes herein described, and the functionalities involved. The methods, user equipments and network nodes will subsequently, as a non-limiting example, be described in a 3GPP/LTE environment, but the embodiments of the disclosed methods and user equipment may operate in a wireless communication system 100 based on another access technology such as e.g. any of the above enumerated. Thus, although the following embodiments are described based on 3GPP LTE systems, it is by no means limited to 3GPP LTE.

The illustrated wireless communication system 100 comprises a user equipment 110 and a serving network node 120, which is serving a serving cell 121, wherein the user equipment 110 is situated, at least for the moment. The wireless communication system 100 further comprises a neighbour network node 130, which is serving a neighbour cell 131, neighbour to the serving cell 121. Between the serving cell 121 and the neighbour cell 131 is a cell border 150 situated, in which area a Hand Over (HO) may be performed under some circumstances. Such circumstances may comprise e.g. that the signal strength of a signal received from the serving network node 120, as measured by the user equipment 110 is weaker than the signal strength of a signal received from the neighbour network node 130, possibly by addition of a hysteresis. Other circumstances may comprise e.g. load sharing between the serving network node 120 and the neighbour network node 130.

The serving network node 120 controls the radio resource management within the serving cell 121, such as e.g. allocating radio resources to the user equipment units 110 within the serving cell 121 and ensuring reliable wireless communication between the serving network node 120 and the user equipment 110. The serving network node 120 may typically comprise an eNodeB, e.g. in an LTE-related wireless communication system 100.

The user equipment 110 is configured to transmit radio signals comprising information to be received by the serving network node 120. Contrariwise, the user equipment 110 is configured to receive radio signals comprising information transmitted by the serving network node 120.

It is to be noted that the illustrated network setting of network nodes 120, 130 and user equipment 110 in FIG. 2 is to be regarded as a non-limiting embodiment only. The wireless communication network 100 may comprise any other number and/or combination of network nodes 120, 130 and/or user equipment units 110, although only one instance of a user equipment 110 and two instances of network nodes 120, 130, respectively, are illustrated in FIG. 2, for clarity reasons. A plurality of network nodes 120, 130 and/or user equipment units 110 may further be involved in the present methods according to some embodiments.

Thus whenever "one" or "a/an" network node 120, 130 and/or user equipment 110 is referred to in the present context, a plurality of network nodes 120, 130 and/or user equipment units 110 may be involved, according to some embodiments.

The serving network node 120 and the neighbour network node 130 may according to some embodiments be referred to as e.g. base stations, NodeBs, evolved Node Bs (eNBs, or eNode Bs), base transceiver stations, Access Point Base Stations, base station routers, Radio Base Stations (RBSs), macro base stations, micro base stations, pico base stations, femto base stations, Home eNodeBs, sensors, beacon devices, relay nodes repeaters or any other network nodes configured for communication with the user equipment 110 over a wireless interface, depending e.g. of the radio access technology and terminology used.

The user equipment 110 may be represented by e.g. a wireless communication terminal, a mobile cellular phone, a Personal Digital Assistant (PDA), a wireless platform, a mobile station, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the serving network node 120 and/or the neighbour network node 130.

According to embodiments described herein, low delay and thereby successful handover as well as low power consumption of the user equipment 110 is provided. This is achieved according to a some embodiments by enabling an event triggered configuration of the discontinuous reception cycle of the user equipment 110, as will be described. Further, according to some embodiments, a gradual adjustment of the discontinuous reception cycle during handover procedure may be made, in order for timely handover along with low power consumption of the user equipment.

Within the current standard of 3GPP LTE, the measurement of the user equipment 110 only happen within the on-duration of discontinuous reception cycles, which is configured by the network using Radio Resource Control (RRC) signalling. However, to ensure a timely handover, one or a plurality of events may be defined beforehand to trigger a short discontinuous reception cycle.

In an example embodiment, the discontinuous reception cycle may be configured as 1.28 s for ordinary downlink Physical Downlink Control Channel (PDCCH) demodulation, while it may be reduced during handover procedure, e.g., to 20 ms, to ensure a timely downlink measurement before the serving link fails to work. The triggering event, for switching between long and short discontinuous reception cycle may be defined in different forms, according to different embodiments.

According to some embodiments, the triggering event may comprise measuring for example received power, or received quality, of a signal received from the serving network node 120 and comparing it with a threshold limit. Such measurement may be e.g. Reference Signal Received Power (RSRP), or Reference Signal Received Quality (RSRQ), to mention some possible examples of such measurements according to different examples.

When the received power, or received quality of the signal received from the serving network node 120 exceeds the threshold limit, the signal propagation conditions are good, why the probability for a handover within the closest future is low. For that reason, the discontinuous reception cycle may be set to a long time value such as e.g. 1.28 s. And vice versa, when the received power, or received quality of the signal received from the serving network node 120 does not exceed the threshold limit, the signal propagation conditions are less favourable, which may trigger a handover according to the implemented handover mechanism. Thus the discontinuous reception cycle may be set to a short time value, such as e.g. 20 ms, to ensure a timely downlink measurement before the serving link fails to work.

Corresponding measurements may according to further embodiments be made on signals received from the neighbour network node 130. However, the triggering relation with the threshold limit becomes the opposite, such that when the received power, or received quality of the signal received from the neighbour network node 130 exceeds a threshold limit, the signal propagation conditions of an alternative radio link over the neighbour network node 130 are good, which increases the probability for the user equipment 110 making a handover within the closer future.

Further, the switch from long discontinuous reception cycle into short discontinuous reception cycle, and vice versa may be triggered by a specific link quality threshold, such as e.g., a specific value of RSRP/RSRQ of a signal received from the serving network node 120 and/or a signal received from the neighbour network node 130, according to some embodiments. The signals here discussed are according to embodiments herein received and measured by the user equipment 110. Further, switching the discontinuous reception cycle may be triggered by a threshold level related to the difference between a RSRP, or a RSRQ, of a signal received from the serving network node 120 and corresponding measurement made on a signal received from the neighbour network node 130.

However, according to some embodiments, switching the discontinuous reception cycle of the user equipment 110 may be triggered by the network side, such as by the serving network node 120, which normally determines which user equipment 110 to handover, and when to do it, based on signal measurements received from the user equipment 110. The event may according to some embodiments be defined and configured by network side beforehand, e.g., configured using RRC signalling. The adjustment of the discontinuous reception cycle may be fully initiated by the user equipment 110 autonomously according to some embodiments, since it only affects the measurements made by the user equipment 110, but does not relates to scheduling.

Figure 3:
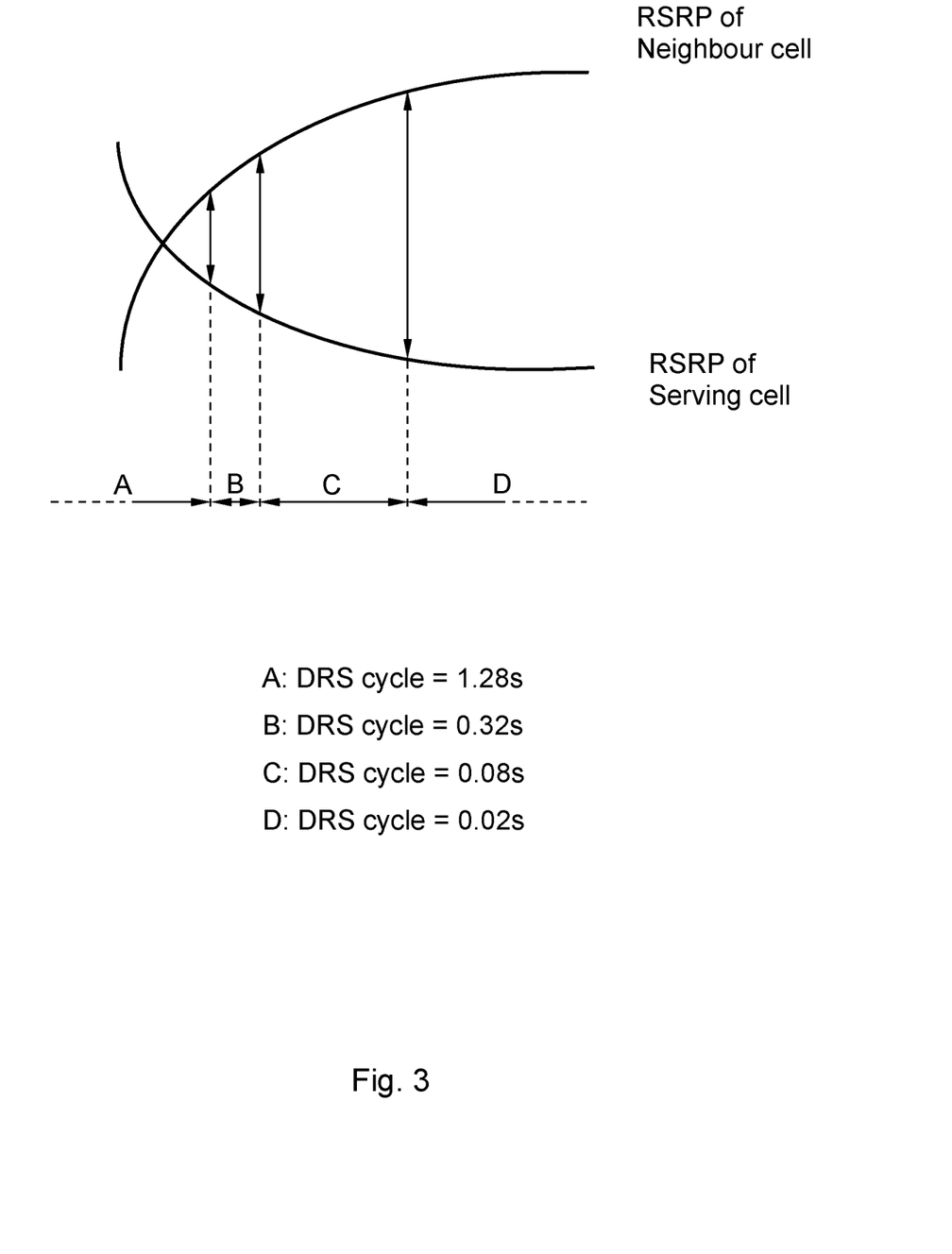
FIG. 3 is a block diagram illustrating an enhanced DRX mechanism for handover, according to some embodiments.

FIG. 3 discloses an embodiment enabling a gradual adjustment of the discontinuous reception cycle during handover procedure. According to the illustrated example, it may be assumed that the user equipment 110 is moving from the serving network node 120 in direction of the neighbour network node 130, and that the user equipment 110 at the beginning of the illustrated embodiment, i.e. for time period A, has been set to the long discontinuous reception cycle, here 1.28 s. Note that the herein mentioned values merely serve as illustrative examples of some possible time values. However, the embodiments disclosed herein are by no means limited by these examples of values, which are disclosed for illustrative purpose. The triggering of a short discontinuous reception cycle may be implemented in different forms, according to different embodiments. Take an A3 event as an example, where it may be assumed that the RSRP threshold limit is defined as 4 dB. The A3 event is described in more detail below.

A possible implementation according to some embodiments may be: as soon as the user equipment 110 detects that the RSRP difference reaches 4 dB, i.e., entering the A3 event, the discontinuous reception cycle may be shortened, e.g., from 1.28 s to 20 ms (not shown).

However, this embodiment may not capture the starting point of the A3 event accurately, i.e., the A3 threshold may be reached before the triggering of short discontinuous reception cycle. Therefore, another embodiment is based on a scheme wherein the discontinuous reception cycle is gradually shortened step by step, i.e. reduce discontinuous reception cycle when serving network node 120 becomes weaker and neighbour network node 130 becomes stronger gradually, such as, e.g.:

when the RSRP difference reaches 1 dB, the discontinuous reception cycle is shortened a little, e.g., from 1.28 s to 0.32 s, i.e. for time period B, and then when the RSRP difference reaches 2 dB, the discontinuous reception cycle is further reduced to 0.08 s, i.e. for time period C, and finally, when it reaches 4 dB, the shortest discontinuous reception cycle 0.02 s (20 ms) may be applied, i.e. for time period D, according to some embodiments.

In this way, good balance between power consumption and measurement delay is achieved. Further, when the user equipment 110 is travelling in the opposite direction, i.e. from the cell border 150 towards the serving network node 130, the situation may be the opposite, i.e. that the increasing difference between the RSRP received from the serving network node 120 and the neighbour network node 130 may render a gradually longer discontinuous reception cycle.

It should be noted that the A3 event is only one triggering event of a whole triggering event set, such as, e.g. events A1-A5 for LTE and events B1-B2 for inter-RAT mobility. The A1 event may be said to occur when the measurements indicate that the signal in the serving cell 121 becomes better than an absolute threshold. The A2 event may be said to occur when the measurements indicate that the signal in the serving cell 121 becomes worse than an absolute threshold. The A3 event may be said to occur when the measurements indicate that the signal in the neighbour cell 131 becomes better than an offset relative to the serving cell 121. The A4 event may be said to occur when the measurements indicate that the signal in the neighbour cell 131 becomes better than an absolute threshold. The A5 event may be said to occur when the measurements indicate that the signal in the serving cell 121 becomes worse than one absolute threshold and that the signal in the neighbour cell 131 becomes better than another absolute threshold. The B1 event may be said to occur when the measurements indicate that the signal in the neighbour cell 131 becomes better than an absolute threshold. The B2 event may be said to occur when the measurements indicate that the signal in the serving cell 121 becomes worse than one absolute threshold and that the signal in the neighbour cell 131 becomes better than another absolute threshold. While the A3 event is the most commonly used event in case of handover, it is to be understood that any one of these triggering events or similar events may be used as the triggering event in the embodiments herein.

It should also be noted that this may also be used in order to optimize any discontinuous reception cycle based on the measurements of the user equipment 110; that is, using any of the above events as a change criterion for the discontinuous reception cycle of the user equipment 110.

Once the user equipment 110 send the measurement report to the serving network node 120, the serving network node 120 and the user equipment 110 may switch to an agreed short discontinuous reception cycle so that the Handover Command from the serving network node 120 to the user equipment 110 may be sent to the user equipment 110 quickly, according to some embodiments.

Note: Due to the channel fluctuation, it may be possible that the user equipment 110 leaves the handover operation, e.g., if the RSRP difference becomes less than A3 threshold. In that case, the discontinuous reception cycle should be restored, e.g., back to 1.28 s, in order to keep low power consumption of the user equipment 110.

Figure 4:
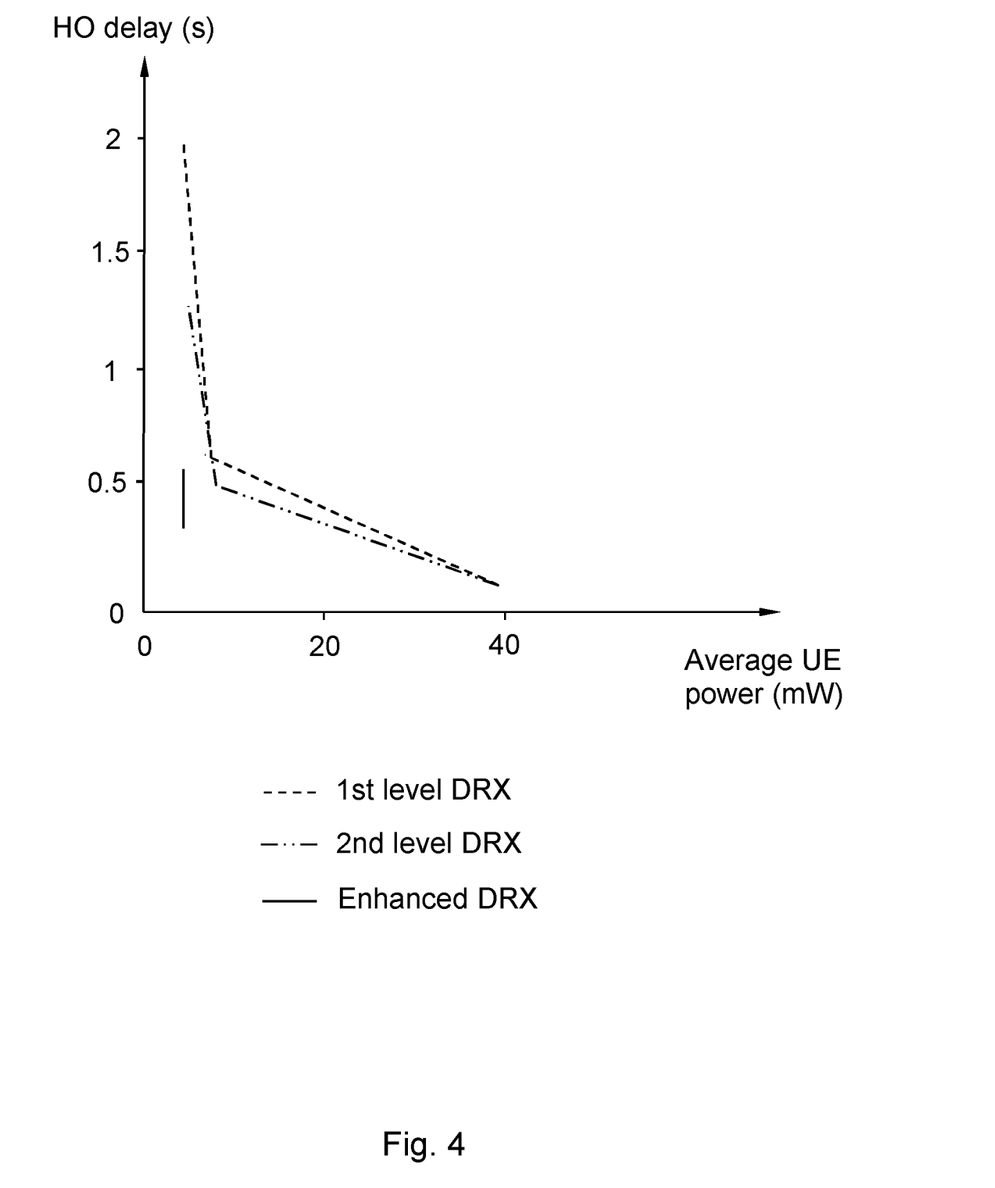
FIG. 4 is a block diagram illustrating simulation results of handover delay versus user equipment power consumption, according to some embodiments.

FIG. 4 is illustrating some simulation results according to embodiments disclosed herein.

In FIG. 4, a 1 level discontinuous reception cycle means that only one discontinuous reception cycle is configured during the whole handover procedure. Also, a 2 level discontinuous reception cycle means that before a measurement report is sent to the eNB, a discontinuous reception with long cycle is applied and after that a discontinuous reception with short cycle is applied. Furthermore, an enhanced discontinuous reception cycle means that the scheme proposed according to some embodiments in this disclosure, i.e. short discontinuous reception cycle is applied by predefined event trigger. From FIG. 4, it is apparent that using the enhanced discontinuous reception cycle scheme for handover, the handover delay is largely reduced while keeping a low power consumption of the user equipment 110.

Figure 5:
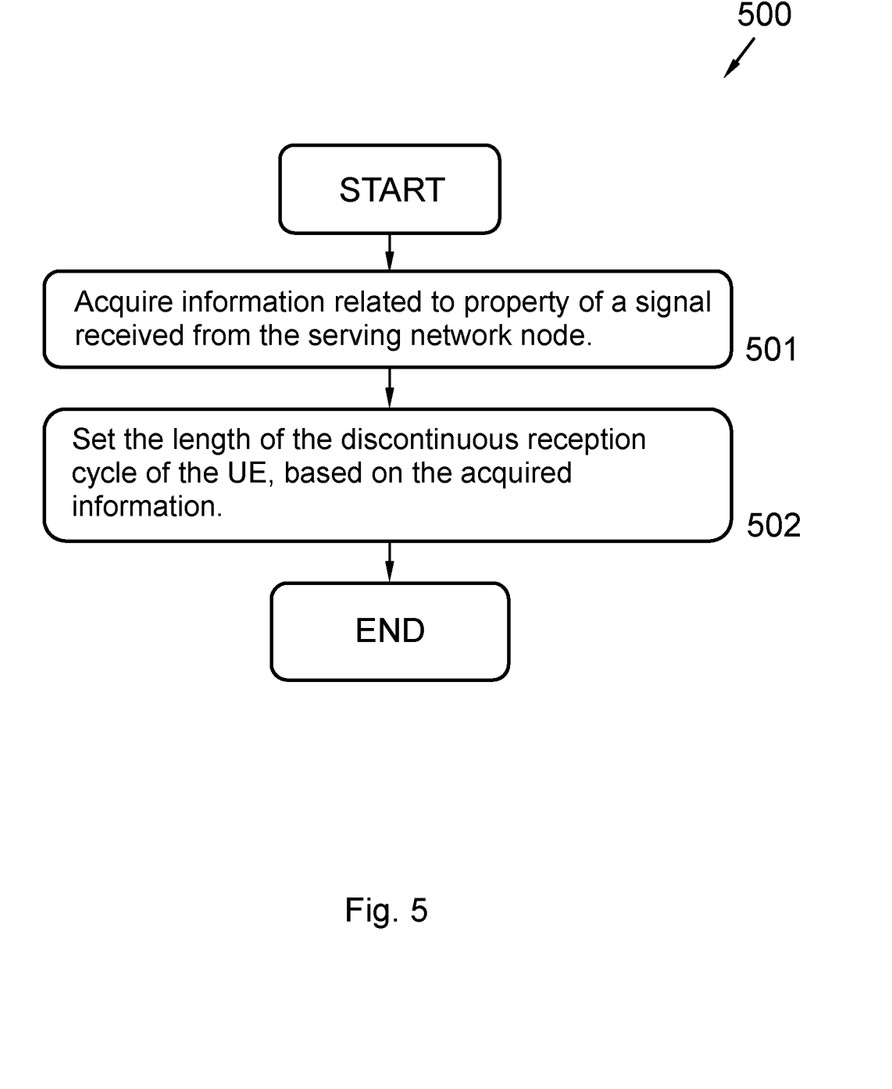
FIG. 5 is a block diagram illustrating embodiments of a method in a user equipment, according to some embodiments.

FIG. 5 is a flow chart illustrating a method 500 in a user equipment 110. The method 500 aims at setting a length of a discontinuous reception cycle (DRX) of the user equipment 110, which is served by a serving network node 120 in a wireless communication network 100.

The wireless communication network 100 may be based on third Generation Partnership Project (3GPP) Long Term Evolution (LTE), according to some embodiments. The wireless communication network 100 comprising the serving network node 120, also comprises a neighbour network node 130. The serving network node 120 and the neighbour network node 130 are radio network nodes comprising e.g. an eNB in some embodiments.

To appropriately set the length of the discontinuous reception cycle, the method 500 may comprise a number of actions 501-502. It is however to be noted that the actions 501-502 may be performed in another chronological order than the enumeration indicates and that both of them, i.e. actions 501 and 502 may be performed simultaneously or in a reversed chronological order. The method 500 may comprise the following actions:

Action 501

The user equipment 110 acquires information related to a property of a signal received from the serving network node 120.

The information may be acquired by measuring either the strength or the quality of a signal received from at least the serving network node 120, according to some embodiments. Further, the information related to the property of the signal received from at least the serving network node 120 may comprise any of RSRP or RSRQ, according to different embodiments.

A possible advantage by measuring signal strength/quality from a signal received from the serving network node 120 may be that it is easy and fast to implement.

According to some embodiments, the information may be acquired by also, in addition, measuring either the strength or the quality of a signal received from a neighbour network node 130. Further, a difference between the measurements may be calculated by subtracting the measurement made on the signal received from the serving network node 120 from the measurement made on the signal received from the neighbour network node 130. The resulting difference may then in turn be compared to a threshold limit for triggering resetting the length of the discontinuous reception cycle.

A possible advantage by measuring signal strength/quality from signals received both from the serving network node 120 and the neighbour network node 130, calculate a difference in signal strength/quality and compare that sum with a threshold limit may be that the user equipment 110 thereby has more reliable information to determine if a handover is to be made or not. Further, the user equipment 110 may perform the method and set the discontinuous reception cycle autonomously, without further input or decision from the serving network node 120.

However, according to some alternative embodiments, the action of acquiring information may comprise receiving an instruction from the serving network node 120. In some embodiments, one or more of the threshold limits may be received in an instruction from the serving network node 120. It should also be noted that for the purpose of some the embodiments described herein the term "instruction" may also be referred to as and be intended to mean a configuration message for configuring the user equipment 110.

A possible advantage therewith may be that the serving network node 120 has control of the situation concerning management and handover of the user equipment 110. Also, computation power and thereby also capacity and battery power of the user equipment 110 may be somewhat saved.

Action 502

Based on the acquired information in Action 501, the user equipment 110 sets the length of the discontinuous reception cycle of the user equipment 110.

The length of the discontinuous reception cycle of the user equipment 110 may be set to a first time when the acquired 501 information exceeds a property threshold limit, and set to a second time when the acquired 501 information does not exceed the property threshold limit, wherein the first time is longer than the second time, according to some embodiments.

In some embodiments, the length of the discontinuous reception cycle of the user equipment 110 may be set to a first time when the acquired 501 information is below a first threshold limit, and otherwise to a second time, wherein the first time is longer than the second time.

A possible advantage with having two lengths of the discontinuous reception cycle, a long and a short, may be that it is easy and robust to implement.

However, according to some embodiments, the length of the discontinuous reception cycle of the user equipment 110 may be set to the second time when the acquired 501 information exceeds the first threshold limit but is lower than a second threshold limit and otherwise to a third time, wherein the first time is longer than the second time and the second time is longer than the third time.

In further addition, the length of the discontinuous reception cycle of the user equipment 110 may be set, according to some embodiments, to a third time when the acquired 501 information exceeds the second threshold limit but is lower than a third threshold limit, and otherwise to a fourth time, wherein the first time is longer than the second time, the second time is longer than the third time and the third time is longer than the fourth time.

Some possible advantages with having gradually varying lengths of the discontinuous reception cycle, based on the signal propagation conditions, may comprise that the discontinuous reception cycle may be further optimised for fulfilling the two goals of having as long discontinuous reception cycle as possible in order to save battery power of the user equipment 110, while ensuring that the user equipment 110 may do the measurements and report these measurements to the serving network node 120 in order to not fail any handover.

The first threshold limit may for example, in some embodiments be set to a value within range 0.5-1.5 dB, the second threshold limit may be set to a value within 1.5-3.5 dB and the third threshold limit may be set to a value within 2.5-6.5 dB, to mention some examples of threshold limits. In one embodiment, the first threshold limit may be set to 1 dB, the second threshold limit may be set to 2 dB and the third threshold limit may be set to 4 dB.

Further, the length of the discontinuous reception cycle of the user equipment 110 may, according to some embodiments for example be set to a first time value within 10-0.5 s, i.e. the long discontinuous reception cycle, while the second time may be a time value within 1-0.1 s. According to some embodiments, the third time may be set to a time value within 0.5-0.02 s, while the fourth time may be set to a value within 0.05-0.01 s.

In an example of a particular embodiment, the first time, which the length of the discontinuous reception cycle of the user equipment 110 is configured to be set to, may be 1.28 s, the second time may be 0.32 s, the third time may be 0.08 s and the fourth time may be 0.02 s.

However, it may be mentioned that according to some embodiments, other figures may be utilized, based on the principles outlined above. Also, some embodiments herein may comprise more than four differentiated discontinuous reception cycle times, such as e.g. 5, 6, . . . , ∞.

It should be noted that the terms "time value", "time period" or "period of time" may herein be interchangeably used for the term "time" when describing the length of the discontinuous reception cycle of the user equipment 110.

It should also be noted that a further advantage of some of the embodiments presented herein is that the length of the discontinuous reception cycle of the user equipment 110 may be set without explicit network configuration signalling, since the setting may only relates to measurements in the user equipment 110.

Figure 6:
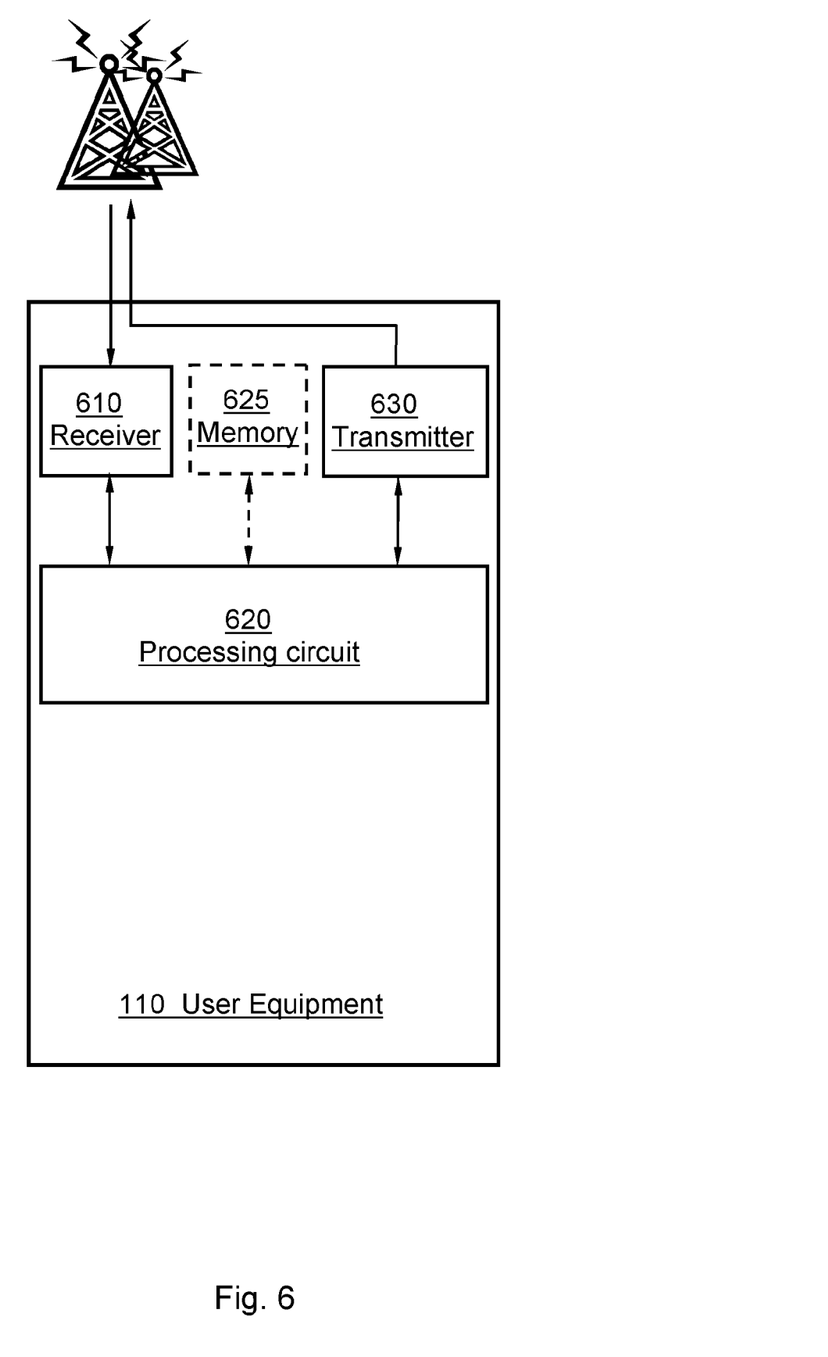
FIG. 6 is a block diagram illustrating an embodiment of a user equipment.

FIG. 6 schematically depicts an embodiment of a user equipment 110 configured to perform the above described actions 501-502.

The user equipment 110 is thus configured for setting a length of a discontinuous reception cycle of the user equipment 110. Further, the user equipment 110 is configured to be served by a serving network node 120 in a wireless communication network 100.

The wireless communication network 100 may be based on third Generation Partnership Project (3GPP) Long Term Evolution (LTE), according to some embodiments. The wireless communication network 100 comprising the serving network node 120, may also comprise a neighbour network node 130. The serving network node 120 and the neighbour network node 130 are radio network nodes comprising e.g. an eNB in some embodiments, configured for wireless communication with the user equipment 110.

For the sake of clarity, any internal electronics or other components of the user equipment 110, not completely indispensable for understanding the implementation of the above described actions 501-502 comprised in the method has been omitted from FIG. 6.

In order to perform the actions 501-502 correctly, the user equipment 110 comprises a processing circuit 620, configured for acquiring information related to a property of a signal received from the serving network node 120, and also configured for setting the length of the discontinuous reception cycle of the user equipment 110, based on the acquired information.

The processing circuit 620 may further be configured for setting the length of the discontinuous reception cycle of the user equipment 110, in some embodiments, to a first time when the acquired information exceeds a property threshold limit, and configured for setting it to a second time when the acquired information does not exceed the property threshold limit, wherein the first time is longer than the second time.

Further, the processing circuit 620 may in addition be configured for acquiring information by measuring either the strength, or the quality of a signal received from the serving network node 120. Such measurement of signal strength, or signal quality, may comprise any of RSRP or RSRQ, according to some embodiments.

According to some embodiments, the processing circuit 620 may be further configured for acquiring information by measuring either the strength or the quality of a signal received from a neighbour network node 130, and calculating a difference between the measurements by subtracting the measurement made on the signal received from the serving network node 120 from the measurement made on the signal received from the neighbour network node 130. Furthermore, the processing circuit 620 may be configured to set the length of the discontinuous reception cycle of the user equipment 110 to a first time when the acquired information is below a first threshold limit, and otherwise to a second time, wherein the first time is longer than the second time.

In addition, the processing circuit 620 in further addition may be configured for setting the length of the discontinuous reception cycle of the user equipment 110 to the second time when the acquired information exceeds the first threshold limit but is lower than a second threshold limit and otherwise to a third time, wherein the first time is longer than the second time and the second time is longer than the third time.

The processing circuit 620 may furthermore be configured for setting the length of the discontinuous reception cycle of the user equipment 110 to the third time when the acquired information exceeds the second threshold limit but is lower than a third threshold limit, and otherwise to a fourth time, wherein the first time is longer than the second time, the second time is longer than the third time and the third time is longer than the fourth time, according to some embodiments.

In some alternative embodiments, the processing circuit 620 may be further configured for acquiring information by receiving an instruction from the serving network node 120. In some embodiments, the processing circuit 620 may further be configured to receive one or more of the threshold limits in an instruction from the serving network node 120.

The processing circuit 620 may comprise e.g. one or more instances of a Central Processing Unit (CPU), a processing unit, a processor, a microprocessor, means for processing data, or other processing logic that may interpret and execute instructions. The processing circuit 620 may further perform data processing functions for inputting, outputting, and processing of data comprising data buffering and device control functions, such as call processing control, user interface control, or the like.

Further yet, embodiments of the user equipment 110 in addition may comprise a receiver 610, configured to receive wireless radio signals from e.g. the serving network node 120 and/or the neighbour network node 130. Thus, the receiver 610 may be configured to receive a signal, such as a reference signal, from the serving network node 120 and/or the neighbour network node 130 to be utilized for measurement of received signal strength, according to some embodiments.

In addition, the user equipment 110 may comprise a transmitter 630 according to some embodiments. The transmitter 630 may be arranged to transmit wireless signals to be received by the serving network node 120 and/or the neighbour network node 130.

According to some embodiments, the user equipment 110 may comprise at least one memory 625. The memory 625 may comprise a physical device utilized to store data or programs i.e. sequences of instructions, on a temporary or permanent basis. According to some embodiments, the memory 625 may comprise integrated circuits comprising silicon-based transistors. Further, the memory 625 may be volatile, non-volatile or comprise some units which are volatile and some units which are non-volatile, according to different embodiments.

Further, it is to be noted that some of the described units 610-630 comprised within the user equipment 110 in the wireless communication system 100 are to be regarded as separate logical entities but not with necessity separate physical entities. To mention just one example, the receiver 610 and the transmitter 630 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the user equipment 110 and the network nodes 120, 130 may comprise both traffic and control signals e.g. paging signals/messages for incoming calls, which may be used to establish and maintain a voice call communication with another party or to transmit and/or receive data, such as SMS, e-mail or MMS messages, with a remote user equipment, or other network nodes comprised in the wireless communication system 100.

The actions 501-502 to be performed in the user equipment 110 may be implemented through one or more processing circuits 620 in the user equipment 110, together with computer program code for performing the functions of the described actions 501-502. Thus a computer program product, comprising instructions for performing the actions 501-502 in the user equipment 110 may set the length of the discontinuous reception cycle of the user equipment 110, based on the acquired information related to a property of a signal received from the serving network node 120, when being loaded into the one or more processing circuits 620.

The computer program product mentioned above may be provided for instance in the form of a data carrier carrying computer program code for performing at least some of the actions 501-502 according to some embodiments when being loaded into the processing circuit 620. The data carrier may be e.g. a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the user equipment 110 remotely, e.g. over an Internet or an intranet connection.

Figure 7:
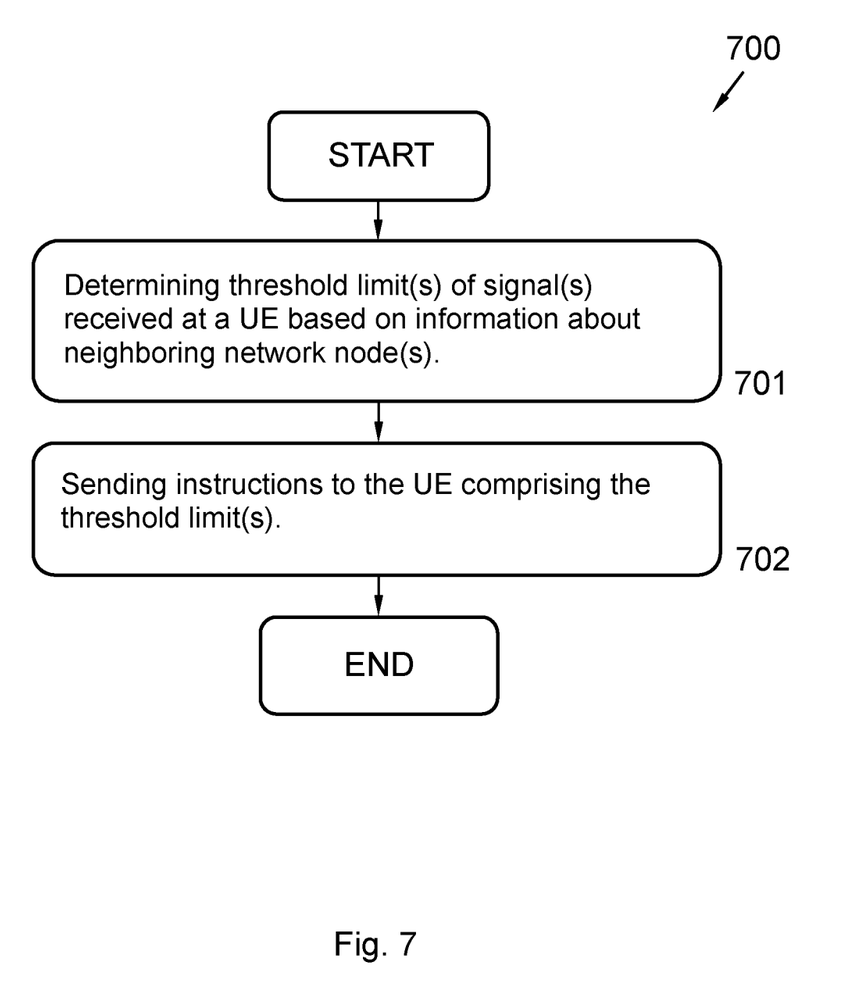
FIG. 7 is a block diagram illustrating embodiments of a method in a network node, according to some embodiments.

FIG. 7 is a flow chart illustrating a method 700 in a network node, e.g. the serving network node 120. The method 700 aims at providing a user equipment 110 with instructions for setting a length of a discontinuous reception cycle (DRX) of the user equipment 110, which is served by a the serving network node 120 in a wireless communication network 100.

The wireless communication network 100 may be based on LTE, according to some embodiments. The wireless communication network 100 comprising the serving network node 120 may also comprises a neighbour network node 130. According to some embodiments, the serving network node 120 and the neighbour network node 130 are radio network nodes comprising e.g. an eNB.

To provide appropriate instructions for setting a length of a discontinuous reception cycle (DRX) of the user equipment 110, the method 700 may comprise a number of actions 701-702. The method 700 may comprise the following actions:

Action 701

The serving network node 120 determines one or more threshold limits for signal(s) received at the user equipment 110 based on information about one or more neighbouring network nodes 130 in the wireless communication network 100.

In some embodiments, the information about one or more neighbouring network nodes 130 in the wireless communication network 100 may be a network scenario change regarding one or more neighboring network nodes 130 in the wireless communication network 100. According to one example, the network scenario change may e.g. be an addition or removal of one or more neighboring network nodes in the wireless communication network 100 which hence changes in the scenario within the wireless communication network 100. In another example, the network scenario change may be determined by the network node 120 based on a report from a user equipment, such as, e.g. a Radio Link Failure (RLF) report. In these cases, the serving network node 110 may adjust or update the determined one or more threshold limits based on the determined network scenario change regarding one or more neighboring network nodes 130 in the wireless communication network 100.

According to any of the embodiments above, this advantageously allows the network node 120 to determine appropriate threshold limits, in regards to e.g. network scenario changes occurring in the wireless communication network 100, to be used by the user equipment 110 when setting the length of the discontinuous reception cycle of the user equipment 110.

A possible further advantage by determine one or more threshold limits at the serving network node 120 is that the serving network node 120 has control of the situation concerning management and handover of the user equipment 110.

It should be noted that the threshold limits may also be referred to a configurable parameter to be used for determining if a triggering event has been triggered, which also may be referred to as change criterion being fulfilled or entry condition being entered. The triggering event may e.g. be implemented as a threshold, an offset and/or a hysteresis. Examples of the triggering events are the events A1-A5 for LTE and events B1-B2 for inter-RAT mobility as described above.

Action 702

When the one or more threshold limits has been determined, the serving network node 120 sends instructions to the user equipment 110 comprising the determined one or more threshold limits. The determined one or more threshold limits is then used in the user equipment 110 when setting the length of the discontinuous reception cycle of the user equipment 110, e.g. as perform in the above described actions 501-502.

In some embodiments, the serving network node 120 may send instructions to the user equipment 110 comprising adjusted or updated determined one or more threshold limits.

This advantageously allows the network node 120 to inform the user equipment 110 about appropriate threshold limits, and to provide the user equipment 110 with updated threshold limits in regards to network scenario changes occurring in the wireless communication network 100.

Figure 8:
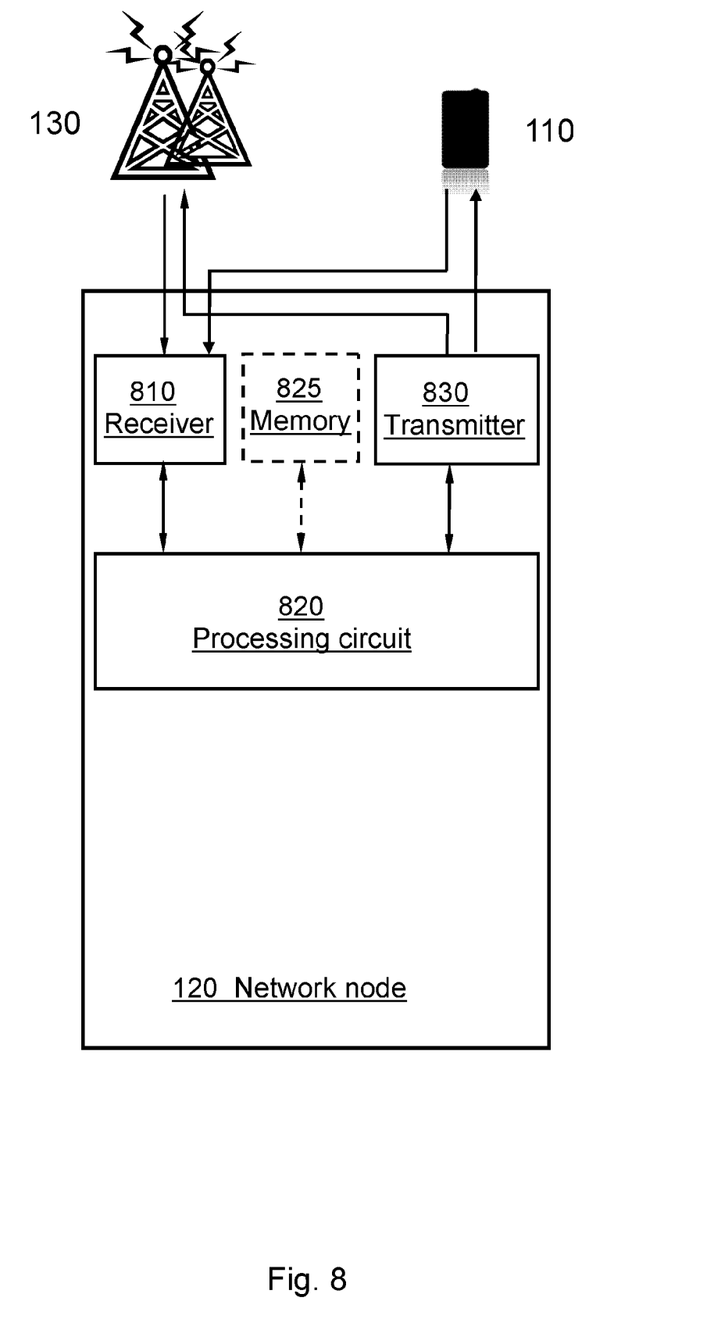
FIG. 8 is a block diagram illustrating an embodiment of a network node.

FIG. 8 schematically depicts an embodiment of a network node, e.g. the serving network node 120, configured to perform the above described actions 701-702.

The serving network node 120 is thus configured to provide a user equipment 110 with instructions for setting a length of a discontinuous reception cycle (DRX) of the user equipment 110. The serving network node 120 is configured to serve the user equipment 110 in a wireless communication network 100.

The wireless communication network 100 may be based on LTE, according to some embodiments. The wireless communication network 100 comprising the serving network node 120, may also comprise a neighbour network node 130. The serving network node 120 and the neighbour network node 130 are radio network nodes comprising e.g. an eNodeB or eNB in some embodiments, configured for wireless communication with the user equipment 110.

For the sake of clarity, any internal electronics or other components of the serving network node 120, not completely indispensable for understanding the implementation of the above described actions 701-702 comprised in the method has been omitted from FIG. 8.

In order to perform the actions 701-702 correctly, the serving network node 120 comprises a processing circuit 820, configured to determine one or more threshold limits for signal(s) received at the user equipment 110 based on information about one or more neighbouring network nodes 130 in the wireless communication network 100. The processing unit 820 is also configured to sends instructions to the user equipment 110 comprising the determined one or more threshold limits. The determined one or more threshold limits enable the user equipment 110 to set the length of the discontinuous reception cycle of the user equipment 110, i.e. the user equipment 110 uses the determined one or more threshold limits when setting the length of the discontinuous reception cycle of the user equipment 110.

When the information about one or more neighbouring network nodes 130 in the wireless communication network 100 is a network scenario change regarding one or more neighboring network nodes 130 in the wireless communication network 100, the processing circuit 620 may further be configured adjust or update the determined one or more threshold limits based on the determined network scenario change regarding one or more neighboring network nodes 130.

The processing circuit 820 may comprise e.g. one or more instances of a Central Processing Unit (CPU), a processing unit, a processor, a microprocessor, means for processing data, or other processing logic that may interpret and execute instructions.

Further, embodiments of the serving network node 120 in addition comprise a receiver 810, which may be configured to receive wireless radio signals from e.g. the user equipment 110. Also, the receiver 810 may be configured to receive signals from e.g. the neighbour network node 130. Thus, the receiver 810 may be configured to receive information from the user equipment 110 and/or the neighbour network node 130 to be utilized in determining the one or more threshold limits, such as, e.g. information regarding an addition or removal of one or more neighboring network nodes in the wireless communication network 100 or a report from a user equipment.

In addition, the serving network node 120 comprises a transmitter 830. According to some embodiments, the transmitter 830 may be arranged to transmit wireless signals to be received by the user equipment 110. The transmitter 830 may also be arranged to transmit information to the neighbour network node 130. Thus, the transmitter 830 may be configured to transmit instructions to the user equipment 110 comprising the determined one or more threshold limits.

According to some embodiments, the serving network node 120 may comprise at least one memory 825. The memory 85 may comprise a physical device utilized to store data or programs i.e. sequences of instructions, on a temporary or permanent basis. According to some embodiments, the memory 825 may comprise integrated circuits comprising silicon-based transistors. Further, the memory 825 may be volatile, non-volatile or comprise some units which are volatile and some units which are non-volatile, according to different embodiments.

Further, it is to be noted that some of the described units 810-830 comprised within the serving network node 120 in the wireless communication system 100 are to be regarded as separate logical entities but not with necessity separate physical entities. To mention just one example, the receiver 810 and the transmitter 830 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the serving network node 120 and the user equipment 110 may comprise both traffic and control signals e.g. paging signals/messages for incoming calls, which may be used to establish and maintain a voice call communication with another party or to transmit and/or receive data, such as SMS, e-mail or MMS messages, with a remote user equipment, or other network nodes comprised in the wireless communication system 100.

The actions 701-702 to be performed in the serving network node 120 may be implemented through one or more processing circuits 820 in the serving network node 120, together with computer program code for performing the functions of the described actions 701-702. Thus, a computer program product comprising instructions for performing the actions 701-702 in the serving network node 120 may send instructions to the user equipment 110, comprising one or more threshold limits for signal(s) received at the user equipment 110 determined based on information about one or more neighbouring network nodes 130 in the wireless communication network 100, when being loaded into the one or more processing circuits 820.

The computer program product mentioned above may be provided for instance in the form of a data carrier carrying computer program code for performing at least some of the actions 701-702 according to some embodiments when being loaded into the processing circuit 820. The data carrier may be e.g. a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the serving network node 120 remotely, e.g. over an Internet or an intranet connection.

It should also be noted that while the embodiments herein may be directed towards improving measurements in the user equipment 110 to reduce delay before transmitting a measurement report, it may in some systems, e.g. in a WCDMA system, also be a need to reduce delay after transmitting a measurement report, i.e. between measurement reporting and handover command. In such cases, however, the length of the discontinuous reception cycle of a user equipment may instead be based on the transmissions of measurement reports, rather than relate to a property of a signal.

The terminology used in the detailed description of the particular exemplary embodiments illustrated in the accompanying drawings is not intended to be limiting of the described methods 500 and user equipments 110, which instead are limited by the enclosed claims.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention claimed is:

1. A method in a user equipment for setting a length of a discontinuous reception cycle of the user equipment before triggering a handover, wherein the user equipment is served by a serving network node in a wireless communication network, the method comprising:
   acquiring information related to a property of a signal received from the serving network node, wherein the step of acquiring information comprises:
      measuring either the strength or the quality of the signal received from the serving network node;
      measuring either the strength or the quality of a signal received from a neighbour network node; and
      calculating a difference between the measurements by subtracting the measurement made on the signal received from the serving network node from the measurement made on the signal received from the neighbour network node; and
   setting the length of the discontinuous reception cycle of the user equipment, based on the acquired information, wherein the length of the discontinuous reception cycle of the user equipment is set to a first time when the difference between the measurements is below a first threshold limit, and otherwise set to a second time, wherein the first time is longer than the second time.

2. The method according to claim 1, wherein:
   the length of the discontinuous reception cycle of the user equipment is set to the second time when the difference between the measurements exceeds the first threshold limit but is lower than a second threshold limit and otherwise to a third time, wherein the first time is longer than the second time and the second time is longer than the third time.

3. The method according to claim 2, wherein:
   the length of the discontinuous reception cycle of the user equipment is set to a third time when the difference between the measurements exceeds the second threshold limit but is lower than a third threshold limit, and otherwise to a fourth time, wherein the first time is longer than the second time, the second time is longer than the third time and the third time is longer than the fourth time.

4. The method according to claim 1, wherein:
the action of acquiring information comprises receiving an instruction from the serving network node.

5. The method according to claim 1, further comprising:
receiving one or more threshold limits in an instruction from the serving network node.

6. The method according to claim 1, wherein the wireless communication network is based on third Generation Partnership Project "3GPP" Long Term Evolution "LTE", and wherein the information related to a property of a signal received from the serving network node comprises any of Reference Signal Received Power "RSRP" or Reference Signal Received Quality "RSRQ".

7. A user equipment for setting a length of a discontinuous reception cycle of the user equipment before triggering a handover, wherein the user equipment is served by a serving network node in a wireless communication network, the user equipment comprising a processing circuit, the processing circuit configured to:
acquire information related to a property of a signal received from the serving network node, wherein acquiring the information the processor is configured to:
measure either the strength or the quality of the signal received from the serving network node;
measure either the strength or the quality of a signal received from a neighbour network node; and
calculate a difference between the measurements by subtracting the measurement made on the signal received from the serving network node from the measurement made on the signal received from the neighbour network node; and
set the length of the discontinuous reception cycle of the user equipment, based on the acquired information, wherein the processing circuit is further configured to set the length of the discontinuous reception cycle of the user equipment to a first time when the difference between the measurements is below a first threshold limit, and otherwise to a second time, wherein the first time is longer than the second time.

8. The user equipment according to claim 7, wherein:
the processing circuit is further configured to set the length of the discontinuous reception cycle of the user equipment to the second time when the difference between the measurements exceeds the first threshold limit but is lower than a second threshold limit and otherwise to a third time, wherein the first time is longer than the second time and the second time is longer than the third time.

9. The user equipment according to claim 8, wherein:
the processing circuit is further configured to set the length of the discontinuous reception cycle of the user equipment to the third time when the difference between the measurements exceeds the second threshold limit but is lower than a third threshold limit, and otherwise to a fourth time, wherein the first time is longer than the second time, the second time is longer than the third time and the third time is longer than the fourth time.

10. The user equipment according to claim 7, wherein:
the processing circuit is further configured to acquire information by receiving an instruction from the serving network node.

11. The user equipment according to claim 7, wherein:
the processing circuit is further configured to receive one or more threshold limits in an instruction from the serving network node.

12. The user equipment according to claim 7, wherein the wireless communication network is based on third Generation Partnership Project "3GPP" Long Term Evolution "LTE", and wherein the information related to a property of a signal received from the serving network node comprises any of Reference Signal Received Power "RSRP" or Reference Signal Received Quality "RSRQ".

13. A method in a network node for providing instructions for setting a length of a discontinuous reception cycle of a user equipment before a handover is triggered, wherein the user equipment is served by the network node in a wireless communication network, the method comprising:
determining one or more threshold limits for one or more signals received at the user equipment based on information about one or more neighbouring network nodes in the wireless communication network, and
sending instructions to the user equipment comprising the determined one or more threshold limits, which determined one or more threshold limits enable the user equipment to set the length of the discontinuous reception cycle of the user equipment to a first time if a difference between a measurement of either the strength or the quality of a signal received from the serving network node and a measurement of either the strength or the quality of a signal received from at least one neighbour network node is below a first threshold limit, and otherwise to a second time, wherein the first time is longer than the second time.

14. A network node for providing instructions for setting a length of a discontinuous reception cycle of a user equipment served by the network node in a wireless communication network, the network node comprising:
a processing circuit configured to:
determine one or more threshold limits for one or more signals received at the user equipment based on information about one or more neighboring network nodes in the wireless communication network; and
send instructions to the user equipment comprising the determined one or more threshold limits, which determined one or more threshold limits enable the user equipment to set the length of the discontinuous reception cycle of the user equipment to a first time if a difference between a measurement of either the strength or the quality of a signal received from the serving network node and a measurement of either the strength or the quality of a signal received from at least one neighbour network node is below a first threshold limit, and otherwise to a second time, wherein the first time is longer than the second time.

* * * * *